United States Patent [19]

Wieclawski

[11] Patent Number: 5,673,971
[45] Date of Patent: Oct. 7, 1997

[54] HINGE ASSEMBLY FOR A VEHICLE REAR SEAT

[75] Inventor: Stanislaw Andrzej Wieclawski, Grob-Gerau, Germany

[73] Assignee: Delphi Automotive Systems Deutschland GmbH, Wuppertal, Germany

[21] Appl. No.: 572,522

[22] Filed: Dec. 14, 1995

[30] Foreign Application Priority Data

Jun. 16, 1995 [GB] United Kingdom ............ 9512334

[51] Int. Cl.⁶ .................................................. B60N 2/02
[52] U.S. Cl. .............................. 297/378.11; 297/216.14; 296/68.1
[58] Field of Search .................... 297/378.12, 378.11, 297/216.14; 296/68.1

[56] References Cited

U.S. PATENT DOCUMENTS

| | | | |
|---|---|---|---|
| 2,815,796 | 12/1957 | Lobanoff | 296/68.1 X |
| 4,402,547 | 9/1983 | Weston et al. | 297/378.11 |
| 4,438,974 | 3/1984 | Kresky et al. | 297/378.11 |
| 4,475,769 | 10/1984 | Crawford et al. | |
| 4,629,252 | 12/1986 | Myers et al. | 297/378.12 X |
| 5,346,281 | 9/1994 | Hughes | 297/378.11 X |
| 5,370,440 | 12/1994 | Rogala | 297/216.14 |
| 5,482,349 | 1/1996 | Richter et al. | 297/378.12 X |

FOREIGN PATENT DOCUMENTS

| | | |
|---|---|---|
| 0 474 368 A1 | 3/1992 | European Pat. Off. . |
| 0 564 962 A2 | 10/1993 | European Pat. Off. . |
| 197808 | 8/1978 | Germany ........... 297/378.11 |

*Primary Examiner*—Peter M. Cuomo
*Assistant Examiner*—David E. Allred
*Attorney, Agent, or Firm*—Patrick M. Griffin; Ernest E. Helms

[57] ABSTRACT

A hinge for a backrest of a seat in which the backrest can pivot between an upright position and a horizontal position and in which the backrest can be latched at one edge in the upright position. The hinge includes a first member securable to an opposed edge of the backrest; a second member securable to a vehicle body; a third member positioned between the first and second members; a fourth member positioned adjacent the third member below the first member; a first pin secured to the third member about which the first member can pivot; a second pin secured to the second member about which the third member can pivot; a third pin secured to the third member about which the fourth member can pivot; and a fourth pin secured to the second member about which the fourth member can pivot; wherein the axes of the pins are parallel; wherein the edge of the first member toward the fourth member has teeth; and wherein the edge of the fourth member toward the first member has teeth. The positioning of the pins is such that when force is applied to the first member in a direction to move the backrest to the horizontal position while the backrest is latched in the upright position, the first pin moves the third member about the second pin, whereby the third pin moves the fourth member about the fourth pin to bring the teeth on the first and fourth members into locking engagement.

1 Claim, 3 Drawing Sheets

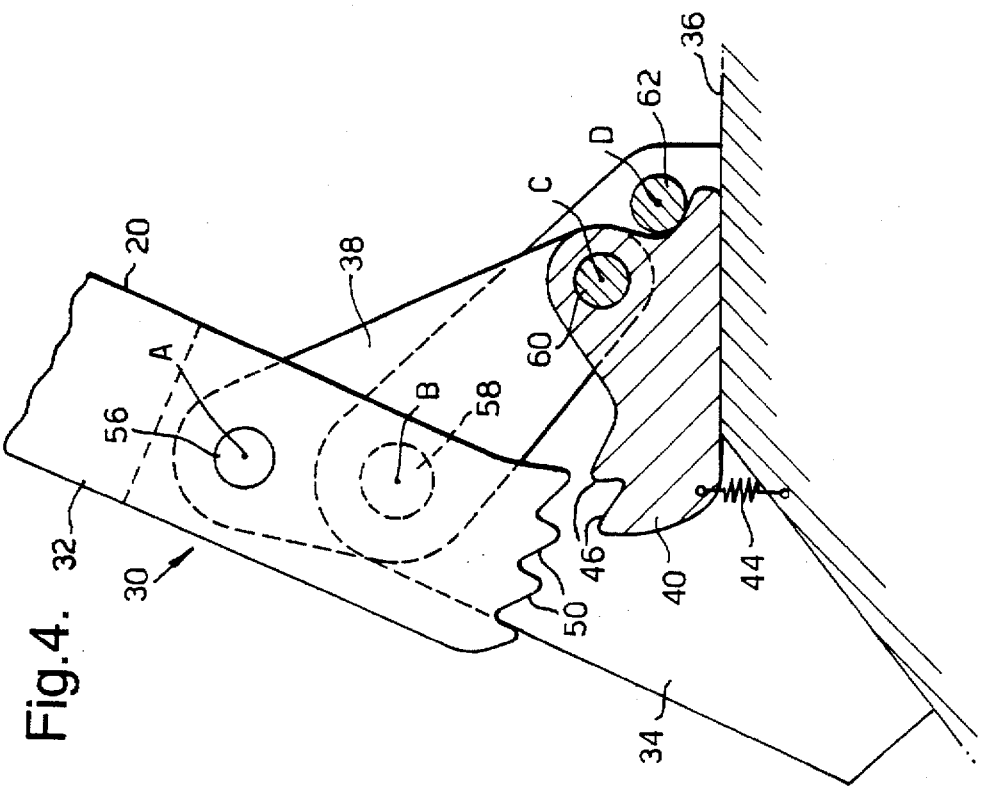
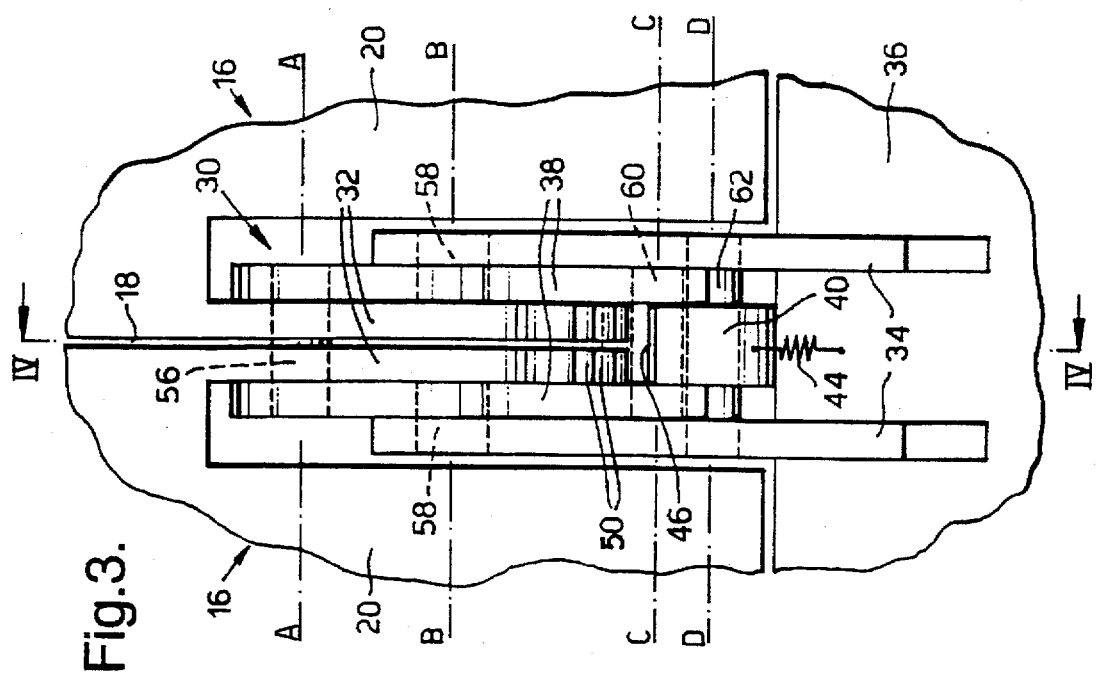

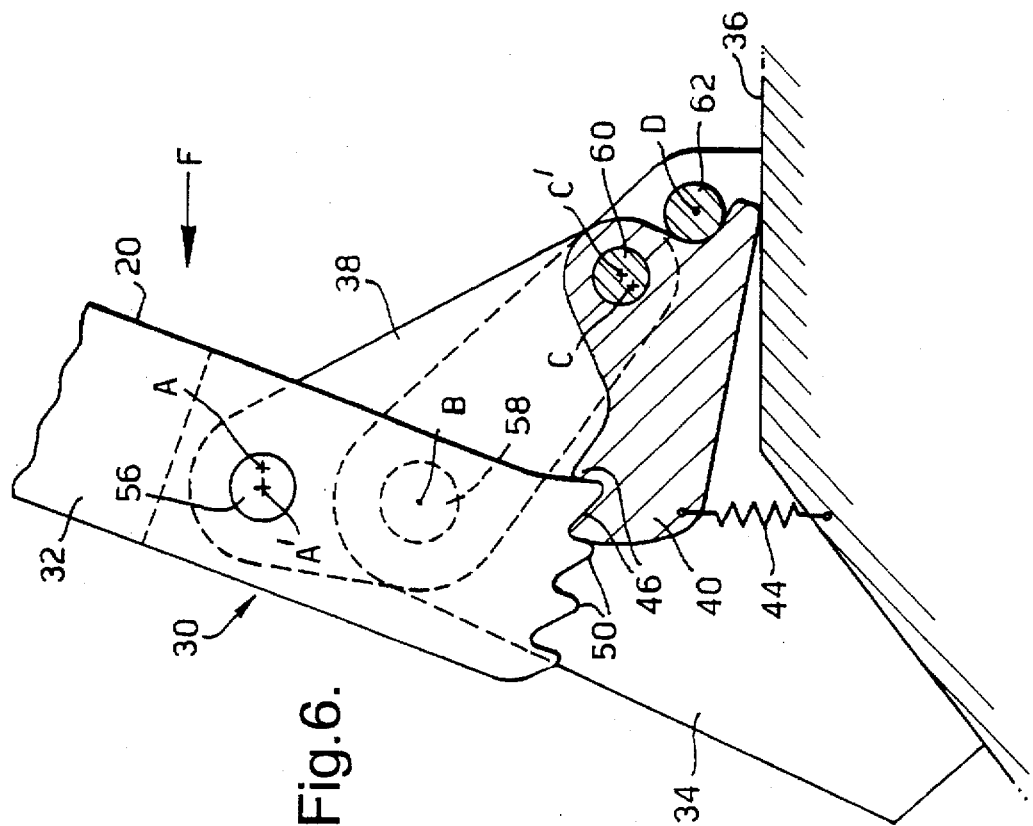
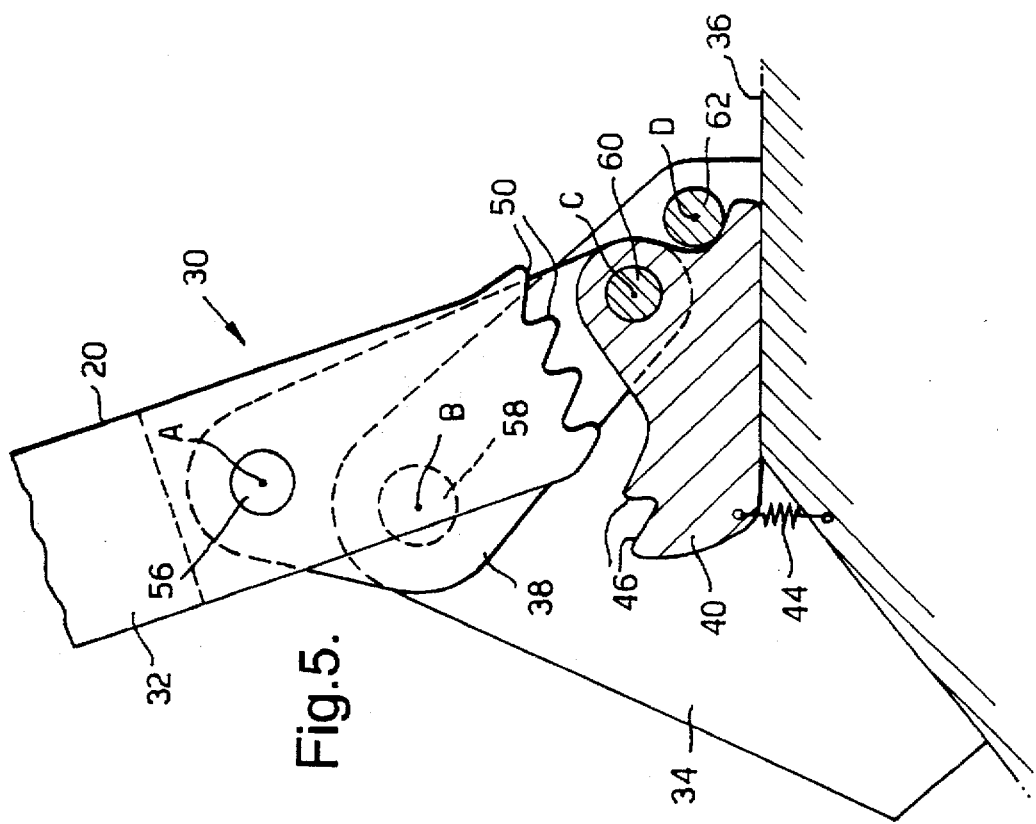

HINGE ASSEMBLY FOR A VEHICLE REAR SEAT

FIELD OF THE INVENTION

The present invention relates to a hinge assembly for split folding backrests for the rear seat of a motor vehicle.

BACKGROUND OF THE INVENTION

Motor vehicles are now commonly produced with a rear seat which is split into two parts. Hinges are provided towards the bottom edge of the backrest of each part of the rear seat to allow each backrest to pivot between its normal substantially vertical (upright) position and a substantially horizontal position across the associated seat cushion. The hinges usually include a hinge arrangement at the split between the two backrests. Catches are provided on the edges of the backrests remote from the split to lock the backrests in their vertical position. Each catch can be released to allow its associated backrest to pivot. Where a luggage compartment is positioned directly behind the rear seat, it is preferable to provide a locking arrangement at the hinge at the split. The locking arrangement locks the hinge to reduce the risk of damage being caused to the backrests, hinges and/or catches should a heavy load in the luggage compartment move and strike the backrests.

It is known to provide a hinge at the split between the backrests which has a locking arrangement which is engaged when each backrest is in its normal substantially vertical position. The releasing system for the locking arrangement is associated with the catch for the backrest such that the catch and the locking arrangement are released substantially simultaneously. This release system is difficult to assemble and is not reliable.

SUMMARY OF THE INVENTION

It is an object of the present invention to provide an improved locking arrangement for the hinge assembly at the split in the backrests of the rear seats.

To this end, a hinge assembly in accordance with the present invention for a backrest of a rear seat of a vehicle in which the backrest can pivot between a substantially upright position and a substantially horizontal position and in which the backrest can be latched at one edge in the substantially upright position comprises a first member securable to the opposed edge of the backrest, a second member securable to a body portion of the vehicle, a third member positioned between the first member and the second member, a fourth member positioned adjacent the third member and below the first member, a first pin secured to the third member about which the first member can pivot, a second pin secured to the second member about which the third member can pivot, a third pin secured to the third member about which the fourth member can pivot, and a fourth pin secured to the second member about which the fourth member can pivot, wherein the axes of the pins are substantially parallel, the edge of the first member directed towards the fourth member has teeth, and the edge of the fourth member directed towards the first member has teeth. The relative positioning of the pins is such that when a force is applied to the first member in a direction which attempts to move the backrest to the horizontal position while the backrest is latched in the upright position, the first pin moves to pivot the third member about the second pin, whereby the third pin moves to pivot the fourth member about the fourth pin to bring the teeth on the first and fourth members into engagement to lock the hinge assembly.

The present invention also includes a backrest including a hinge assembly as claimed herein, and a rear seat for a vehicle having a backrest including a hinge assembly as claimed herein.

BRIEF DESCRIPTION OF THE DRAWINGS

The present invention will now be described, by way of example, with reference to the accompanying drawings, in which:

FIG. 3 is an enlarged view of the area labeled III in FIG. 2 when viewed from the front of the seat;

FIG. 4 is a cross-sectional view on the line IV—IV of FIG. 3 with the backrest in its substantially vertical position;

FIG. 5 is a view similar to that of FIG. 4 with the backrest in its substantially horizontal position; and FIG. 6 is a view similar to that of FIG. 4 with the backrest in its substantially vertical position but when subjected to a substantially horizontal force.

DESCRIPTION OF THE PREFERRED EMBODIMENT

Figure 1:
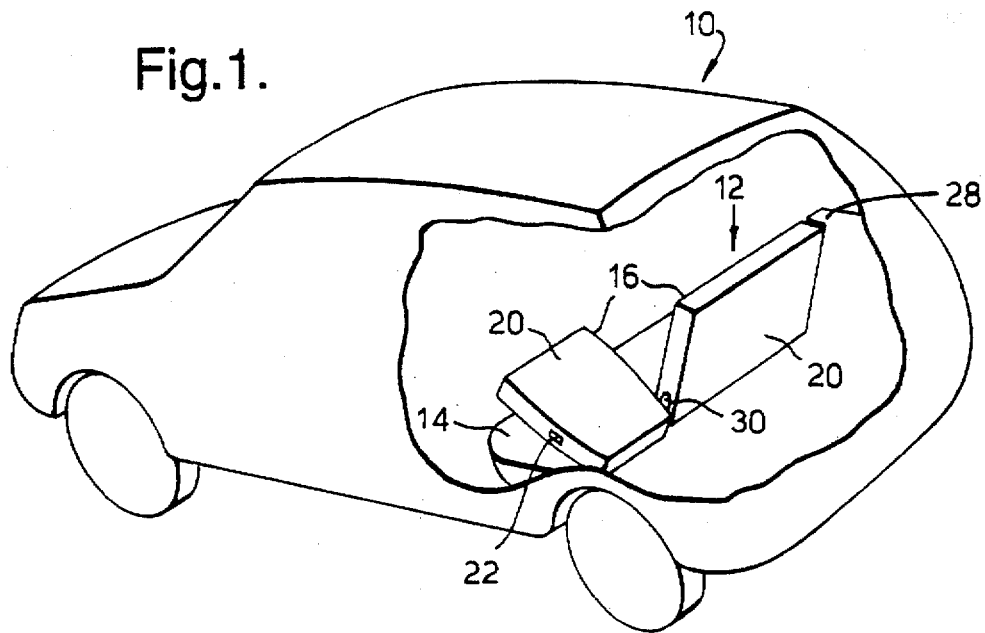
FIG. 1 is a cut-away view of a motor vehicle having a rear seat with split folding backrests and hinge assembly in accordance with the present invention.
Figure 2:
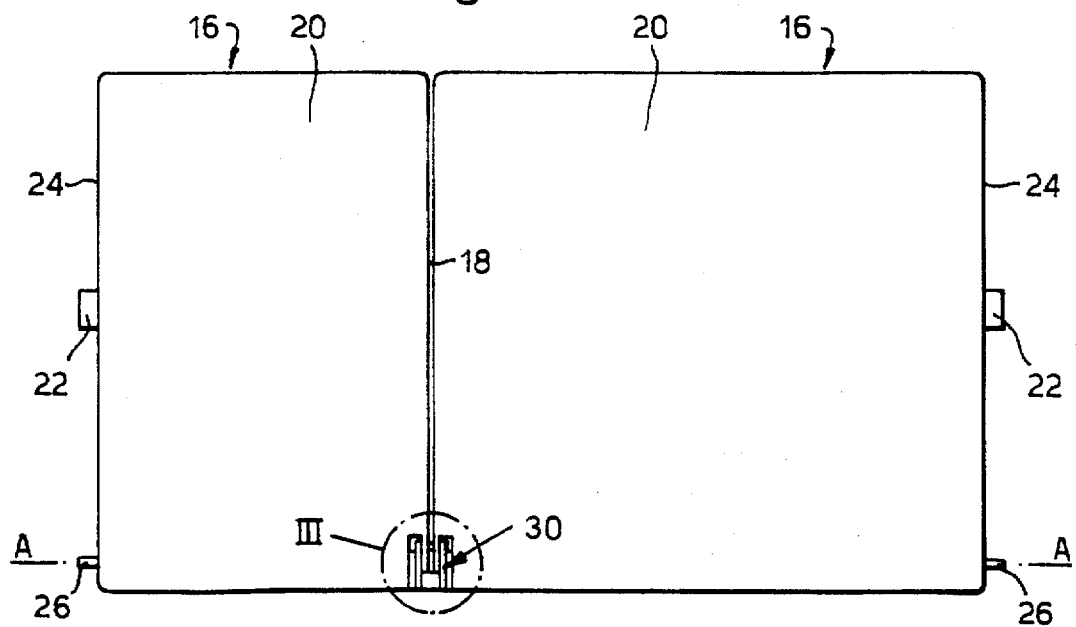
FIG. 2 is a rear view of the split folding backrests and hinge assembly of FIG. 1.

Referring to FIGS. 1 and 2 of the drawings, a motor vehicle 10 is shown having a rear seat 12. The rear seat 12 comprises a seat cushion 14 and a pair of folding backrests 16 with a split 18 therebetween. Each backrest 16 comprises a substantially rigid support portion 20, a catch 22 at the edge 24 remote from the split 18, and a hinge pin 26 at the edge 24. Each catch 22 can latch with a portion 28 of the vehicle body to releasably lock the associated backrest 16 in a normal substantially vertical (or upright) position. Each catch 22 may be such that the associated backrest 16 can be latched in any one of four different upright positions, each upright position being at a small angle relative to the next adjacent upright position. Release means (not shown) for the catches 22 can be any known arrangement. Each hinge pin 26 also engages the portion 28 of the vehicle body, and along with a hinge assembly 30 (details of which are described below) at the split 18, provides a pivot axis A for each backrest 16 to allow each backrest to fold to a substantially horizontal position across its associated part of the seat cushion 14.

The present invention lies in the arrangement of the hinge assembly 30, which will now be described in greater detail with reference to FIGS. 3 through 6. The hinge assembly 30 comprises, for each backrest 16, a first plate-like member 32 which is integral with (as shown), or secured to, the support portion 20 of the backrest; a second foundation plate-like member 34 which is secured to a mounting portion of the body 36 of the motor vehicle 10; a third plate-like bell crank member 38 which is pivotally mounted on the second plate-like member; and a fourth plate-like member or welding member 40 which is pivotally mounted on the third plate-like member. The third plate-like member 38 is positioned between the first plate-like member 32 and the second plate-like member 34. The fourth plate-like member 40 is positioned adjacent the third plate-like member 38 and below the first plate-like member 32.

The first plate-like member 32 is pivotally mounted on the third plate-like member 38 by a first pin 56 which is secured to the third plate-like member. The axis of the first pin 56 normally aligns with the axis A of the hinge pins 26. The first plate-like member 32 has a number of teeth 50 at one edge directed downward toward the fourth plate-like member 40.

The third plate-like member 38 is pivotally mounted on the second plate-like member 34 by a second pin 58 which is secured to the second plate-like member.

The fourth plate-like member 40 is pivotally mounted on the third plate-like member 38 by a third pin 60 secured to the third plate-like member. The fourth plate-like member 40 can also pivot about a fourth pin 62 which is secured to the second plate-like member 34 adjacent the body portion 36. The fourth plate-like member 40 is biased to a normal or rest position against the body portion 36 by a spring 44. The fourth plate-like member 42 has a pair of teeth 46 at its edge remote from the fourth pin 62 directed substantially upward toward the teeth 50 on the first plate-like member 32.

The first pin 56 has an axis corresponding to axis A. The second pin 58 has an axis B. The third pin 60 has an axis C. The fourth pin 62 has an axis D. The axes A–D of the pins 56–62 are substantially parallel. The relative positioning of the pins 56–62 is such that the third plate-like member 38 acts as a lever such that any movement of the first pin 56 about the axis B of the second pin 58 causes movement of the third pin 60 about the axis B. Any movement of the third pin 60 about the axis B causes the fourth plate-like member 40 to pivot about the fourth pin 62.

In the normal upright position of the backrest 16, with the backrest latched in place by its catch 22, the associated hinge assembly 30 has the layout as shown in FIG. 4. The fourth plate-like member 40 is biased against the body portion 36 by the spring 44.

If the catch 22 is released, the backrest 16 is free to pivot about axis A of the first pin 56 and the associated hinge pin 26, as the first plate-like member 32 pivots about the first pin 56. This is depicted in FIG. 5.

FIG. 6 depicts the case where the backrest 16 is in its substantially upright position and is latched in place by its catch 22, and the backrest, and hence the first plate-like member 32, is subjected to a force F. Such a force may be generated when a load or the like strikes the rear of the rear seat 12. In this instance, the force F moves the first plate-like member 32 such that the axis of the first pin 56 moves from position A to position A' about the axis B of the second pin 58. Because the first pin 56 is secured to the third plate-like member 38, the third plate-like member pivots about the axis B of the second pin 58 and the axis of the third pin 60 moves from position C to position C' about the axis B. Such movement of the third pin 60 causes the fourth plate-like member 40 to pivot about the axis D of the fourth pin 62 against the bias of the spring 44. Such movement of the fourth plate-like member 40 brings the teeth 46 on the fourth plate-like member into engagement with the teeth 50 on the first plate-like member 32 to lock the hinge assembly 30 as the fourth plate-like member is effectively wedged between the first plate-like member and the fourth pin 62. This locking arrangement substantially prevents any further movement of the first plate-like member 32, and so substantially prevents any further movement of the backrest 16 due to the force F. Removal of the force F brings the axis of the first pin 56 back to position A and the axis of the third pin 60 back to position C, and the spring 44 restores the fourth plate-like member 40 to its rest position as shown in FIG. 4.

The first plate-like member 32 is shown as having four teeth 50. This number corresponds to the number of possible upright positions of the backrest 16 and allows for changes in the initial relative position of the first plate-like member 32 to the fourth plate-like member 40. This substantially ensures engagement of teeth 46 with teeth 50 irrespective of the initial upright position of the backrest 16.

The locking arrangement of the present invention is only effective when the backrest is subjected to a force. It is not dependent on detection of a predetermined deceleration of the vehicle. It is not locked during normal usage of the vehicle and therefore does not need to be released in order to fold down the backrest. The hinge assembly of the present invention is also simpler and easier to manufacture and assemble, when compared to the known prior art.

In the above described arrangement and as shown in the drawings, the hinge assembly 30 has parts which are common to each backrest 16. For example, the first pin 56, the third pin 60, the fourth pin 62, and the fourth plate-like member 40 are common parts for the hinge assembly for each backrest 16. It will be appreciated that these common parts may be split such that a separate hinge assembly in accordance with the present invention may be provided for each backrest 16.

While this invention has been described in terms of a preferred embodiment thereof, it will be appreciated that other forms could readily be adapted by one skilled in the art. Accordingly, the scope of this invention is to be considered limited only by the following claims.

What is claimed is:

1. A hinge assembly for a backrest of a rear seat of a vehicle that allows the backrest to pivot between a substantially upright position and a substantially horizontal position when released from a releasably latched upright position and subjected to normal pivoting forces said backrest, when latched and subjected to dislodging forces greater than said normal pivoting forces directed forwardly of said vehicle that tend to pivot said backrest toward the horizontal, is further prevented from movement in the directions of said dislodging forces by said hinge assembly, said hinge assembly comprising, a foundation plate secured to a mounting portion of said vehicle body, a backrest plate secured to and movable with said backrest, said backrest mounted plate having a lowermost toothed end above and spaced from said vehicle body mounting portion, an intermediate bell crank indirectly pivoting said backrest plate to said foundation plate, said bell crank having a central pivot on said foundation plate, an upper pin above said central pivot and a lower pin located below and rearward of said central pivot and spaced from said vehicle mounting portion, whereby forces moving either pin in either direction as said bell crank rotates on said central pivot will move the other pin in the opposite direction, said backrest plate further being pivoted to said bell crank upper pivot pin, so that said dislodging forces tend to move said upper pivot pin forwardly of said vehicle, thereby rotating said bell crank in one selected direction of rotation ,while simultaneously moving said lower bell crank pin rearward and upward, said backrest plate also thereby being pivotable between said upright and horizontal positions directly about said upper pivot pin, and thereby indirectly pivotable relative to said foundation plate, and, a wedging block located between said bell crank pivot pin and said vehicle body mounting portion and beneath said back rest plate and rotatably joined to said bell crank lower pivot pin, said wedging block also being pivoted to said foundation plate at a pivot axis located below and rearward of said bell crank lower pivot pin, so as to be able to pivot in the direction of rotation opposite to said one selected direction of rotation about said pivot axis as said bell crank pivots in said one selected direction of rotation, resilient biasing means holding said wedging block abutment with said vehicle body mounting portion when said back rest and backrest plate are subjected to normal pivoting forces, thereby preventing said bell crank lower pivot pin and said bell crank from moving, but yielding when said back rest and backrest plate are subject to dislodging forces, thereby allowing said wedging block to pivot up about its pivot axis in the opposite direction of rotation to that of said bell crank, and, teeth on said wedging block located spaced from and below said backrest plate teeth and engageable with said backrest plate teeth when said wedging block pivots up, whereby, when said backrest is unlatched and moved between said upright and horizontal positions, said resilient biasing means maintains said wedging block down, thereby preventing said bell crank lower pivot pin from moving and preventing said bell crank and bell crank upper pivot pin from moving, and thereby allowing said backrest plate to pivot directly about said bell crank upper pivot pin, but when said backrest is latched and subjected to dislodging forces, said bell crank pivots about said central pivot in said one selected direction said bell crank lower pivot pin moves rearwardly and upwardly, said wedging block overcomes the holding force of said biasing means and pivots upwardly, and said wedging block teeth engage said backrest plate teeth, thereby preventing said backrest plate and backrest from moving any farther.

* * * * *